T. W. PRITCHARD & M. C. WHITAKER.
PROCESS OF DISTILLATION.
APPLICATION FILED NOV. 12, 1912.
1,110,820. Patented Sept. 15, 1914.
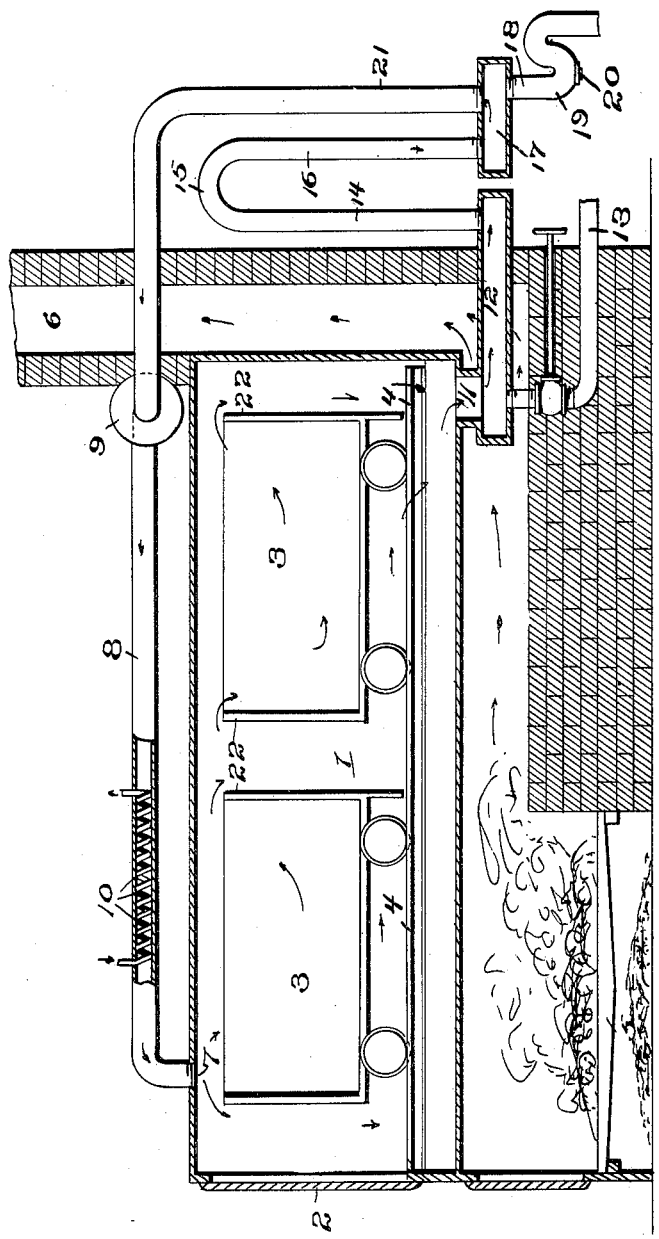
Witnesses
R. S. Trogner
Parker Cook
Inventors.
Thomas W. Pritchard,
and Milton C. Whitaker.
By
Attorney

UNITED STATES PATENT OFFICE.

THOMAS W. PRITCHARD, OF WILMINGTON, NORTH CAROLINA, AND MILTON C. WHITAKER, OF NEW YORK, N. Y.

PROCESS OF DISTILLATION.

1,110,820.  Specification of Letters Patent.  Patented Sept. 15, 1914.

Application filed November 12, 1912. Serial No. 730,997.

*To all whom it may concern:*

Be it known that we, THOMAS W. PRITCHARD and MILTON C. WHITAKER, citizens of the United States, residing, respectively, at Wilmington, in the county of New Hanover, State of North Carolina, and at New York city, county and State of New York, have invented certain new and useful Improvements in Processes of Distillation, of which the following is a description, reference being had to the accompanying drawings, forming a part hereof.

Our invention relates to the distillation of wood and other substances and has for its object to increase the production of more volatile and more valuable fractional distillates and reduce the time necessary to effect the distillation.

With these objects in view our invention consists in the process as hereinafter described and claimed of circulating the gases in a heated retort containing a charge of wood or other non-liquid material in fragments or pieces through the retort and through a condenser so that the gases loaded with the substances which are vaporizable at the temperature to which the retort and its contents are heated are carried out of the retort, the vapors condensed more or less completely and the gases carrying more or less uncondensed vapors, returned to the retort. By circulating the gases the heat is equalized throughout the retort so that all portions of the charge are heated to substantially the same temperature and maintained at the temperature found necessary for driving of the fractional distillate desired to be produced.

The drawing is a longitudinal sectional view of an apparatus adapted to carry out our process and is intended as illustration merely and not as in any way limiting the invention to the use of this or any particular form of apparatus.

In the drawing 1 is a retort having a door 2 at one end through which cars 3 carrying the wood or other material forming the charge may be introduced, track 4 being provided for the cars to run on. The retort may be heated by any convenient means, the heating means here shown being a furnace 5 from which the products of combustion pass along under the retort to a stack 6. In the top of the retort near the entrance end is an opening 7 to which a pipe 8 leads from the outlet opening of a fan or blower 9. This pipe is preferably provided with means for heating it here shown as coils 10 through which heated oil or other heating medium may be circulated. In the bottom of the retort near its other end is an outlet opening 11 from which leads a horizontal pipe 12 preferably provided with an outlet pipe 13 for the outflow of products which are either liquid when driven off like rosin or pitch or are very readily condensed. To the outer end of horizontal pipe 12 is connected one end of a vertical pipe 14, the upper end of which is connected by an inverted U 15, with the upper end of a pipe 16, the lower end of which is connected to a horizontal pipe 17 from which a pipe 18 having a trap 19 and drainage plug 20, leads to a condenser (not shown). From the pipe 17 a vertical pipe 21 leads upward and forward to the inlet opening of the fan 9.

The cars 3 are preferably provided with end plates 32 of such height as to obstruct the current of gases and thus serve as baffle plates.

In operation, the retort having been charged and heat applied, the fan 9 is set in operation drawing the heated gases and vapors out through outlet 11 through the pipe 12 and the condenser pipe 14, 15, 16, where the vapors will be more or less condensed and the liquid of condensation will flow into the pipe 17 and out through the outlet pipe 18. The gases will be drawn up through pipe 21 and will be forced through the pipe 8 where they are reheated by the heating coils 10 and then enter the retort through the inlet opening 7. There is thus maintained a continuous circulation of gases carrying more or less uncondensed vapors through the retort equalizing the heat in the retort so that all parts of the charge are equally heated, the baffle plates aiding in causing the gases to be distributed throughout the material on the cars.

The condenser pipe 14, 15, 16, and the pipe 21 which serve as a condenser pipe for any vapors which may not be condensed in pipes 14, 15, 16, may, if desired, be cooled by a spray of water or in any well known manner. Any products which may condense or collect in the pipe 12 may be withdrawn through pipe 13.

The apparatus necessary to carry out the process may be readily applied to any retort in use whatever heating means it may be provided with.

The process is particularly adapted for use in the destructive treatment of resinous wood in which the turpentine and more volatile constituents are first driven off by heating the contents of the retort to a temperature less than that necessary to begin destructive distillation, in that it enables the temperatures necessary for the production of the several fractional distillates to be maintained throughout the several parts of the retort and thus insures the driving off of all of the turpentine or other fractional distillate which is present in any part of the charge without raising any other part of the charge to a temperature above that at which the particular fractional distillate is drawn off.

Having thus described our invention what we claim is:

1. The herein described process of distillation which consists in so charging a retort with wood or other non-liquid material in fragments or pieces in a container that space for circulation of gases is left between the charge and the walls of the retort and the material is kept from contact with said walls, heating the retort, withdrawing the gases and vapors produced by the action of the heat in the charge, condensing a portion of the vapors and equalizing the heat throughout the charge by returning uncondensed gases to the retort and causing them to circulate through the charge.

2. The herein described process of distillation which consists in so charging a retort with wood or other non-liquid material in fragments or pieces in a container that space for circulation of gases is left between the charge and the walls of the retort and the material is kept from contact with said walls, heating the retort, withdrawing the gases and vapors produced by the action of the heat in the charge, cooling the gases and vapors so withdrawn to condense the vapors, heating the uncondensed gases and equalizing the heat throughout the charge by returning the heated gases to the retort and circulating them through the charge.

THOMAS W. PRITCHARD.
MILTON C. WHITAKER.

Witnesses to the signature of Thomas W. Pritchard:
W. M. WIGGINS,
S. B. PARKER.

Witnesses to the signature of Milton C. Whitaker:
L. E. MARRS,
FRANK C. ERB.